United States Patent
Cleveland

(10) Patent No.: US 6,695,261 B2
(45) Date of Patent: Feb. 24, 2004

(54) SHOCK ISOLATION SYSTEM FOR SPACECRAFT FAIRING

(75) Inventor: Mark Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/073,617

(22) Filed: Feb. 11, 2002

(65) Prior Publication Data

US 2003/0150959 A1 Aug. 14, 2003

(51) Int. Cl.$^7$ ................................................. B64G 1/10
(52) U.S. Cl. ...................................................... 244/158 R
(58) Field of Search ............................ 244/158 R, 161, 244/118.2, 63, 131

(56) References Cited

U.S. PATENT DOCUMENTS

| | | | | |
|---|---|---|---|---|
| 3,351,307 A | * | 11/1967 | Michel et al. | |
| 3,582,017 A | * | 6/1971 | Zecca | |
| 3,608,848 A | * | 9/1971 | Cantor | |
| 5,743,492 A | * | 4/1998 | Chan et al. | |
| 5,961,078 A | * | 10/1999 | Edberg et al. | |
| 6,086,020 A | * | 7/2000 | Machiussi | |
| 6,131,341 A | * | 10/2000 | Wade et al. | |
| 6,224,020 B1 | * | 5/2001 | Hopkins et al. | |
| 6,244,541 B1 | * | 6/2001 | Hubert | |

FOREIGN PATENT DOCUMENTS

JP    0215699   *  8/1989   ................ 244/161

* cited by examiner

*Primary Examiner*—Tien Dinh
(74) *Attorney, Agent, or Firm*—Terje Gudmestad

(57) ABSTRACT

A launch vehicle assembly has a launch vehicle body (10) having a first slot (48*a*) therein. A first magnet (50*a*) is disposed within the first slot (43*a*). A fairing assembly (12) is positioned adjacent to the vehicle body (10). The fairing assembly (12) has a second slot (30*a*) therein positioned opposite the first slot (48*a*). A second magnet (40*a*) is disposed within the second slot (30*a*) so that the second magnet (40*a*) repels the first magnet (50*a*).

16 Claims, 4 Drawing Sheets

SHOCK ISOLATION SYSTEM FOR SPACECRAFT FAIRING

TECHNICAL FIELD

The present invention relates generally to payload fairings for launch vehicles and, more particularly, to an interface between the fairing and the launch vehicle.

BACKGROUND ART

A launch vehicle is used to launch a payload into the orbit around the earth. The payload, however, needs protection from the atmosphere created at launch. High temperatures and pressures created may damage a sensitive payload. A fairing is typically used to protect the payload. The fairing surrounds the payload in the nose portion of the launch vehicle. Typically, the fairing is detachably mounted to the upper stage of the launch vehicle. As soon as the rocket leaves the atmosphere, the fairing is explosively separated from the launch vehicle and discarded.

Spacecraft are subjected to a broad range of potentially damaging environmental conditions during flight, including shock. The two highest sources of shock to the payload occur during payload fairing separation and payload separation. Traditionally, a mechanical shock attenuation device such as shock rings are employed between the fairing and the payload attachment hardware. This, however, leaves a direct path in place for shock transmission. Although the shock rings employed soften the shock to the payload, they are operationally fragile, cumbersome to install, and add unnecessary weight to the launch vehicle. Further, modern spacecraft have more highly sensitive components than previous spacecraft, and therefore must be designed to sustain high flight shock and vibration environments, at the expense of useful payload-to-orbit mass. Spacecraft must be subject to expensive time-consuming ground tests to validate payload capabilities against severe flight environment including random vibration, acoustics and shock. The spacecraft separation via a clampband is typically the dominant shock source to which components are qualified. Over the past several years, spacecraft manufacturers have funded the development of several low shock clampband systems to fly on various launch vehicles. Spacecraft are typically qualified to this environment by performing two clampband release tests. If a low shock clampband is used, the fairing now becomes the dominant shock source. Spacecraft must still be qualified to higher g's via the clampband release test because it would be to difficult and expensive to qualify the spacecraft using a full scale fairing separation test to envelope the shock.

It would therefore be desirable to provide a structure that reduces the amount of shock on the payload during fairing separation.

SUMMARY OF THE INVENTION

The present invention provides a magnetic interface between the payload fairing and the launch vehicle whereby the fairing is levitated a distance above the launch vehicle when the fairing is separated from the launch vehicle.

In one aspect of the invention, a launch vehicle assembly has a launch vehicle body having a first slot therein. A first magnet is disposed within the first slot. A fairing assembly is positioned adjacent to the vehicle body. The fairing assembly has a second slot therein positioned opposite the first slot. A second magnet is disposed within the second slot so that the second magnet repels the first magnet.

In another aspect of the invention, a method of operating a launch vehicle comprises:

positioning a payload fairing adjacent to a launch vehicle body;

contacting the payload fairing with the launch vehicle body above a predetermined force on the payload fairing;

levitating the payload fairing relative to the launch vehicle body below a predetermined force on the payload fairing; and after levitating the payload fairing, releasing the payload fairing from the lunch vehicle.

One advantage of the invention is that by mitigating shock on the payload during fairing release, less damage to payload is possible. Also, launch and launch vehicle performance does not need to be sacrificed due to added weight of previously known adapting methods.

Other advantages and features of the present invention will become apparent when viewed in light of the detailed description of the preferred embodiment when taken in conjunction with the attached drawings and appended claims.

BEST MODES FOR CARRYING OUT THE INVENTION

Figure 1:
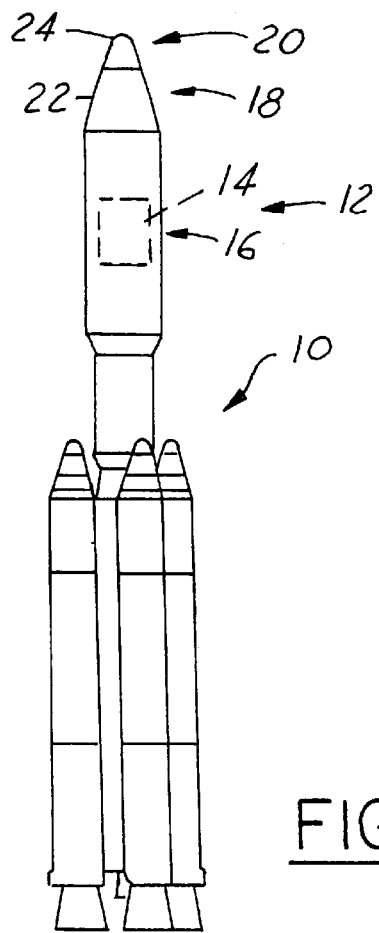
FIG. 1 is a side elevation view of a launch vehicle according to the present invention.

In the following figures, the same reference numerals will be used to identify the same components. While the present invention is illustrated with respect to several embodiments having several cross-sectional views and numbers of magnets, the present invention is equally applicable to various cross-sectional views and numbers of magnets.

Figure 2:
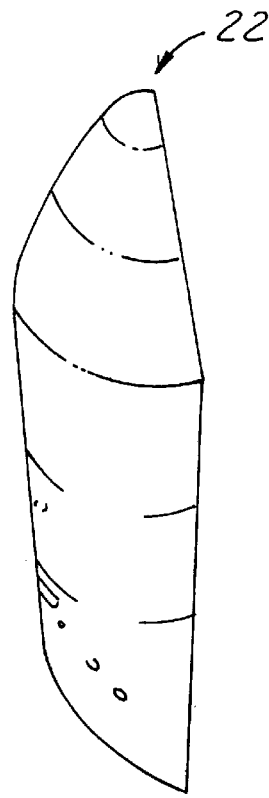
FIG. 2 is a perspective view of a portion of a fairing according to the present invention.

Referring now to FIGS. 1 and 2, a launch vehicle 10 is shown which includes a shroud or fairing 12. Fairing 12 surrounds a payload 14, which is generally a satellite or other space vehicle. It should be understood that any suitable payload may be launched and that any type of launch vehicle may be utilized in the launch. Fairing 12 generally includes three portions; a cylindrical portion 16, a nose cone portion 18, and a nose cap portion 20. Fairing 12 is made up of sectors 22, one of which is shown in FIG. 2. Fairing 12 surrounds the payload to protect it before and during launch until a predetermined point in the launch sequence. The predetermined point may be that sufficient altitude has been achieved, for example. At that predetermined point, fairing 12 is discarded or deployed and sectors 22 are forced to separate and fall away from payload 14.

The payload needs protection from the atmosphere created at launch. The high temperatures and pressures created can damage the sensitive payload. Further, the payload must be protected from the shock of releasing the sectors 22 at the predetermined point during the launch sequence. Antennas or other appendages may easily be damaged from the shock of releasing the fairing. The inventive fairing 12 of the present invention is constructed to dampen the shock on payload 14 when deploying the sectors 22.

Fairing 12 is made up of a number of sectors 22. Typically, two or three sectors 22 are utilized, but those skilled in the art will recognize that various numbers of sectors may be used. Together sectors 22 form the protective housing for payload 14. Sectors 22 are connected to each other to form fairing 12 by conventional means. In the preferred embodiment, the connection is made by using an energetic separation joint common to spacecraft fairing structures. The separation joint hardware is typically bonded or mechanically attached to the edges of sectors 22. The connections are sealed to provide a secure arrangement until fairing 12 is deployed away from payload 14. In one embodiment, compressed gas or explosive devices are used with connectors so that when desired the compressed or explosion separates sectors 22 from one another and away from the payload. The explosive devices may be detonated remotely when the vehicle reaches a predetermined altitude and the sectors fall away from the payload. The payload is then exposed.

Figure 3:
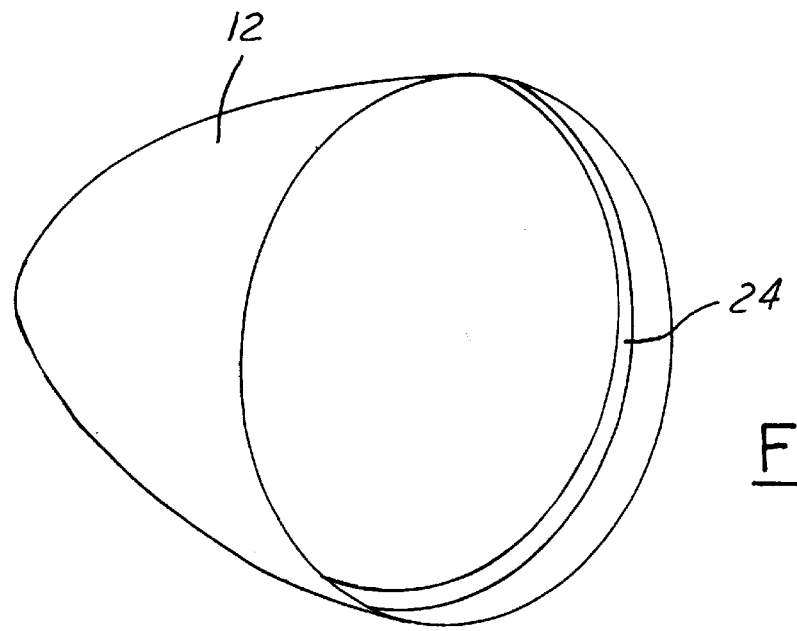
FIG. 3 is an inside view of a fairing according to the present invention.

Referring now to FIG. 3, a perspective view of the inside of fairing 12 is illustrated. As will be further described below, fairing 12 has a ring 24 that extends around the circumference thereof. As will be further described below, ring 24 has magnets therein that cooperate with magnets on the launch vehicle body.

Figure 4:
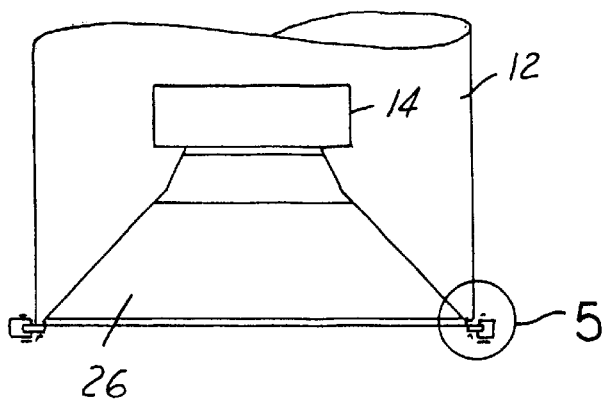
FIG. 4 is a high level cross-sectional view of the interface of the payload attachment fitting and the fairing.

Referring now to FIG. 4, a high level cross-sectional view of fairing 12, payload attachment fitting 26, and an interface 28 therebetween. Further, payload 14 is illustrated coupled to payload attachment fitting 26. Payload attachment fitting 26 is secured directly to the top stage of the body of launch vehicle 10. Fairing 12 and payload attachment fitting 26 are generally circular in cross-section and thus have a circular interface 28 extending around the circumference thereof.

Figure 5:
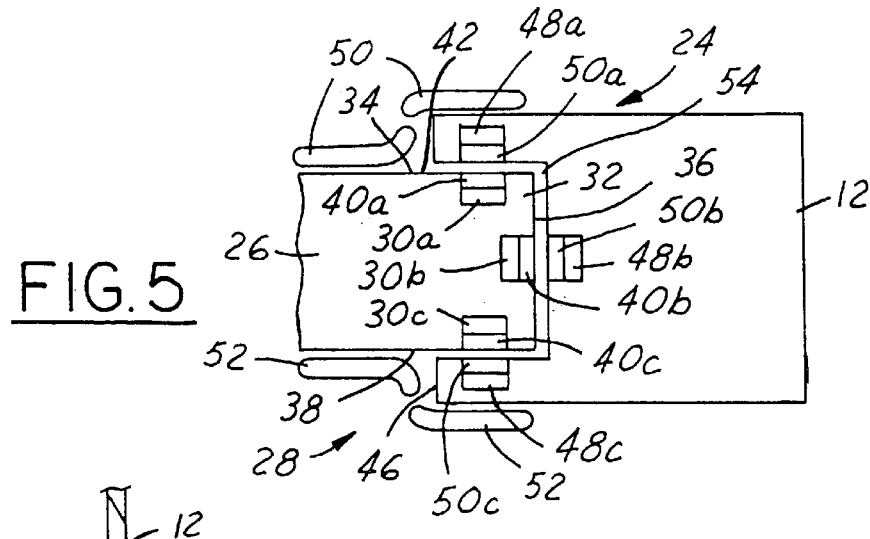
FIG. 5 is a cross-sectional view of the interface of FIG. 4.

Referring now to FIG. 5, interface 28 is illustrated in further detail. As illustrated, payload attachment fitting 26 has a plurality of slots 30a, 30b, and 30c therein. Slot 30a is disposed in a top surface 34 of a lip 32 of payload attachment fitting 26. Slot 30b is disposed in a side surface 36 of lip 32. Slot 30c is disposed in a bottom surface 38 of lip 32. Three magnets 40a, 40b, and 40c are disposed in respective slots 30a, 30b, and 30c.

Ring 24 of payload fairing 12 has a top surface 42, a side surface 44, and a bottom surface 46. These surfaces are complementary to those of lip 32. That is, surfaces 42, 44, and 46 are generally parallel to those of surfaces 34, 36, and 38. By providing complementary surfaces a gap 54 may be maintained therebetween. Top surface 42, side surface 44, and bottom surface 46 have a respective slot 48a, 48b, and 48c. Each slot preferably has a respective magnet 50a, 50b, and 50c.

Magnets 40a, 40b, and 40c, and magnets 50a, 50b, and 50c are preferably formed of neodymium rare-earth magnets. In one constructing embodiment, eight sets of slots, four pairs of opposing slots, were used. Also, various shielding 52 may be disposed around payload attachment fitting 26, payload fairing 12 and magnets 40a, 40b, 40c, 50a, 50b, and 50c. Shielding 52 may be used to shield magnetic energy from the payload and the vehicle body. Payload fairing 12 levitates relative to payload attachment fitting 26 due to the repulsive forces provided by magnets 40a, 40b, and 40c relative to magnets 50a, 50b, and 50c. That is, the magnets are preferably oriented so the same poles are adjacent to each other. For example, the outer face of magnet 50a preferably is a south pole while magnet 40a is also a south pole. The opposite may also be true. By levitation, a gap 54 is positioned between payload fairing 12 and payload attachment fitting 26. It should be noted that during launch, top surface 34 and top surface 42 or portions thereof may actually contact each other until the launch vehicle reaches a predetermined altitude so that a lower force is provided on payload fairing 12 that allows magnets 40a and 50a to maintain a gap 54 therebetween. Prior to the payload fairing 12 being deployed, gap 54 is formed by the magnetic forces of magnets. Thus, the shock forces of the deployment will not be transferred to the payload attachment fitting 26. For example, above 3g's the top surface 34 contacts top surface 42. Below 3g's gap 54 is maintained.

Figure 6:
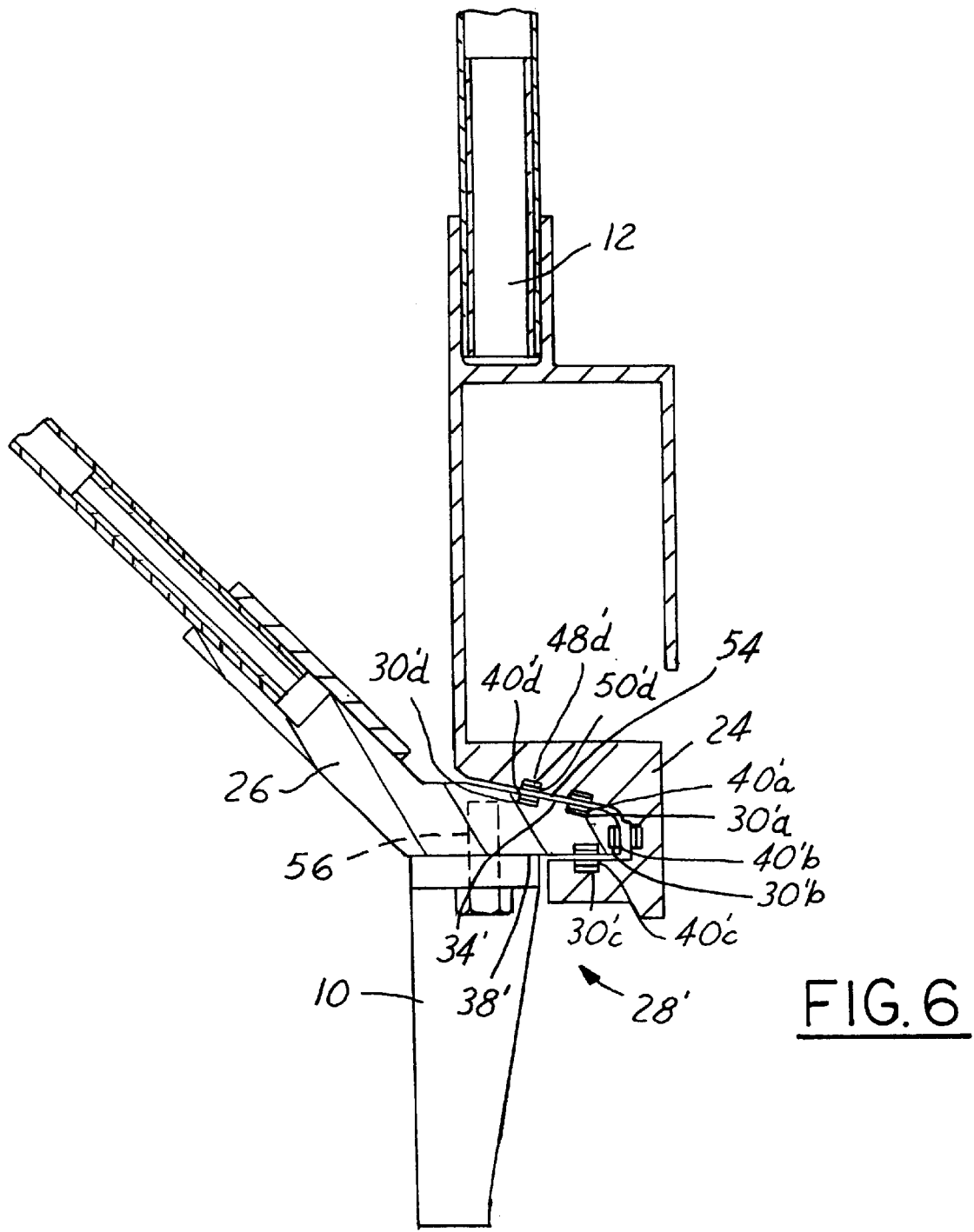
FIG. 6 is a cross-sectional view of a second embodiment of the fairing/payload attachment fitting interface according to the present invention.

Referring now to FIG. 6, a portion of launch vehicle 10 is illustrated coupled by a bolt 56 to payload attachment fitting 26. In this embodiment, top surface 34' is positioned at a angle relative to bottom surface 38'. In this embodiment, a fourth slot 30'D having a magnet 40'D is illustrated. Likewise, ring 24 has an additional slot 48'D with an additional magnet 50'D.

In this embodiment as well, contact may be made between top surface 34 and top surface 42 when excessive force is provided on fairing 12, such as during launch.

Figure 7:
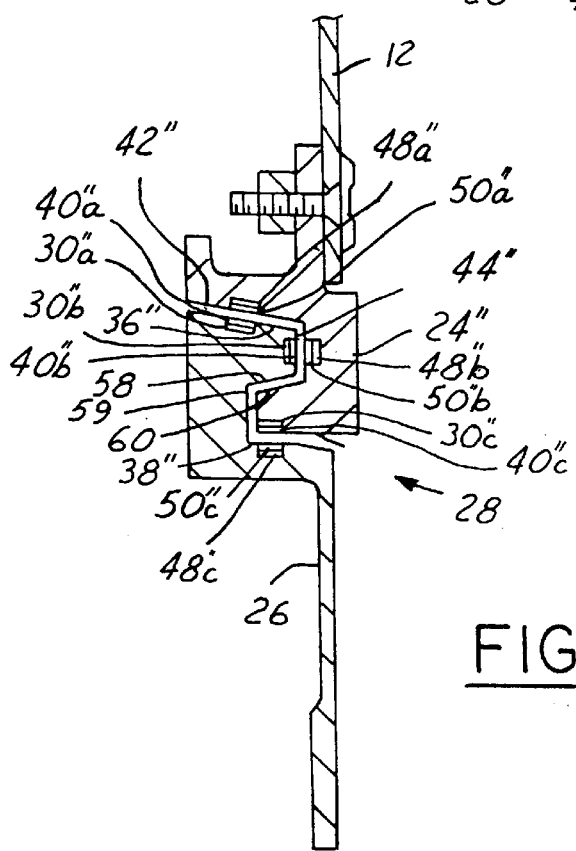
FIG. 7 is a cross-sectional view of a third embodiment of a fairing interface according to the present invention.

Referring now to FIG. 7, a third embodiment of interface 28" is illustrated. In this embodiment, intermediate surfaces 58, 59 are formed on payload attachment fitting 26 while intermediate surfaces 60, 61 are formed on fairing 12. Intermediate surfaces 58, 59, 60, and 61 connect respective side surfaces 36" and 44" with respective bottom surface 38" and 46". Payload attachment fitting 26 has top surface 34", side surface 36", and bottom surface 38". Fairing 12 has top surface 42", side surface 44", and bottom surface 46". Thus, both lip 32" and ring 24" have complimentary surfaces that have been modified from those shown in FIGS. 5 and 6 above.

Figure 8:
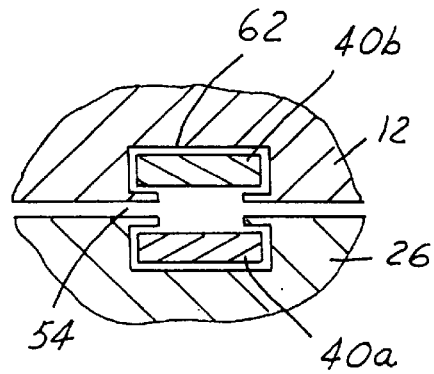
FIG. 8 is an enlarged cross-sectional view of a preferred embodiment of the magnet positions according to the present invention.

Referring now to FIG. 8, slots 30a, 30b, and 30c, and 48a, 48b, and 48c of each of the embodiments may be formed in the same way. The slots may each be formed using a keyhole slot 62 on each of fairing 12 and payload attachment fitting 26. The keyhole slot may be continuous in the surface into which it is formed. However, a discontinuous slot may be employed. The slots preferably correspond to the shape of magnet 40a and 40b. A screw, adhesive or other fastener may be used to maintain the position of the magnets therein.

Figure 9:
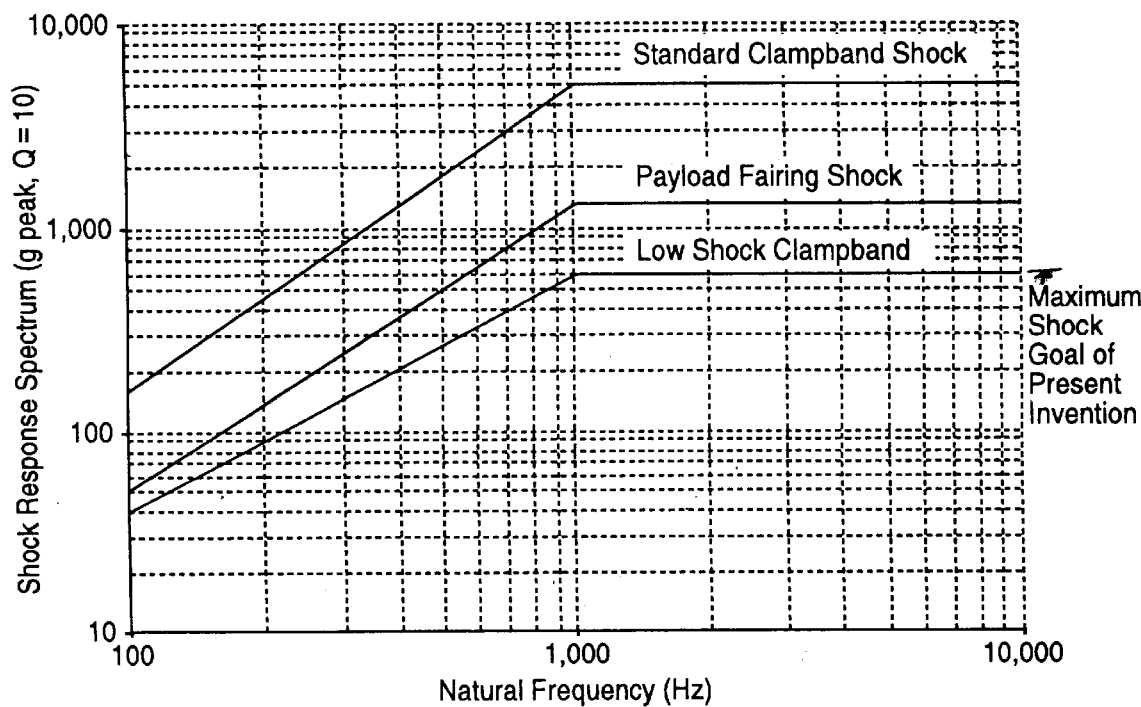
FIG. 9 is plot of shock response spectrum versus the natural frequency of a standard clampband shock, a payload fairing shock, a low shock clampband, and the magnetic interface of the present invention.

Referring now to FIG. 9, various shock responses are illustrated with respect to the natural frequency thereof. The upper line corresponds to the standard clampband shock during payload deployment. The middle line corresponds to the payload fairing shock, while the bottom line illustrates a low shock clampband shock deployment. The maximum goal of the present invention is thus below the low shock clampband.

Figure 10:
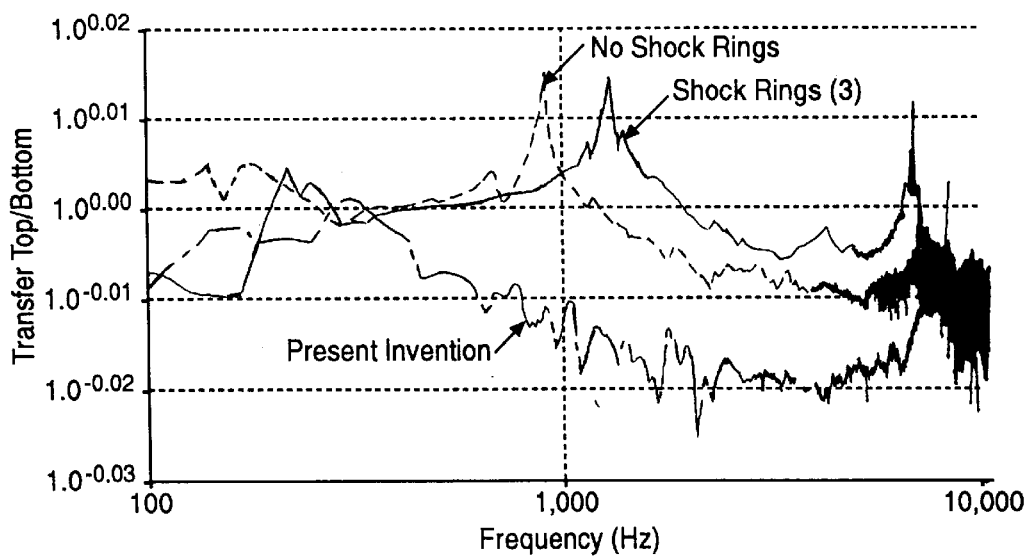
FIG. 10 is a plot of the transfer shock illustrating no shock rings, shock rings, and the magnets of the present invention.

Referring now to FIG. 10, a simulated test was performed with no shock rings, three rings, and a magnetic interface according to the present invention. Separation systems between the payload attachment fitting and the payload ate now used which reduces the shock on the payload. Such devices include clampbands and discrete separation nuts. The remaining dominant shock source is thus payload fairing separation. In operation, when the fairing and payload attachment fitting is assembled, the magnets levitate the fairing relative to the payload attachment fitting and maintain the gap thereby. During launch, excessive forces are generated pushing the payload fairing into contact with the payload attachment fitting. At an increased altitude, lower pressure or force is placed upon the payload fairing, thus the payload fairing is levitated relative to the payload attachment fitting and a gap is maintained therebetween. Thereafter, the payload fairing is commanded to deploy and thus the shock is not transmitted through the payload attachment fitting to the payload.

While particular embodiments of the invention have been shown and described, numerous variations and alternate embodiments will occur to those skilled in the art. Accordingly, it is intended that the invention be limited only in terms of the appended claims.

What is claimed is:

1. A launch vehicle assembly comprising:
   a launch vehicle body having a first slot therein;
   a first magnet disposed within said first slot;
   a fairing assembly positioned adjacent to the vehicle body, said fairing assembly having a second slot therein, said second slot positioned opposite said first slot;
   a second magnet disposed within said second slot so that said second magnet repels said first magnet,
   said fairing assembly contacting the launch vehicle body when a predetermined force acts on the payload fairing and levitating relative to the launch vehicle body when a force below the predetermined force acts on the fairing assembly.

2. A launch vehicle assembly as recited in claim 1 wherein said first magnet and said second magnet comprise neodymium.

3. A launch vehicle assembly as recited in claim 1 wherein said launch vehicle body comprises a payload attachment fitting, said first slot disposed within said payload attachment fitting.

4. A launch vehicle assembly as recited in claim 1 wherein said first slot comprises a keyhole slot.

5. A launch vehicle assembly as recited in claim 1 wherein said second slot comprises a keyhole slot.

6. A launch vehicle assembly comprising:
   a launch vehicle body having a lip therearound, said lip having a first upper surface, a first lower surface and a first side surface extending between said first upper surface and said first lower surface, said first upper surface having a first slot therein, said first side surface having a second slot therein and said first lower surface having a third slot therein;
   a first magnet disposed within said first slot;
   a second magnet disposed within said second slot;
   a third magnet disposed within said third slot;
   a fairing assembly having a ring positioned adjacent to the lip, said ring having an second upper surface adjacent to said first upper surface, a second lower surface adjacent to said first lower surface and a second side surface adjacent to first side surface, said second upper surface having a fourth slot therein, said second side surface having a fifth slot therein and said second lower surface having a sixth slot therein;
   a fourth magnet disposed within said fourth slot;
   a fifth magnet disposed within said fifth slot;
   a sixth magnet disposed within said sixth slot;
   so that said first magnet repels said fourth magnet, said second magnet repels said fifth magnet and said third magnet repels said sixth magnet.

7. A launch vehicle assembly as recited in claim 6 wherein said first magnet, said second magnet and said third magnet comprise neodymium.

8. A launch vehicle assembly as recited in claim 6 wherein said fourth magnet, said fifth magnet, and said sixth magnet comprise neodymium.

9. A launch vehicle assembly as recited in claim 6 wherein said launch vehicle body comprises a payload attachment fitting, said first slot disposed within said payload attachment fitting.

10. A launch vehicle assembly as recited in claim 6 wherein said first slot, said second slot and said third slot comprise a keyhole slot.

11. A launch vehicle assembly as recited in claim 6 wherein said fourth slot, said fifth slot and said sixth slot comprise a keyhole slot.

12. A method of operating a launch vehicle comprising;
    positioning a payload fairing adjacent to a launch vehicle body;
    contacting the payload fairing with the launch vehicle body above a predetermined force on the payload fairing;
    levitating the payload fairing relative to the launch vehicle body below a predetermined force on the payload fairing; and
    after levitating the payload fairing, releasing the payload fairing from the lunch vehicle.

13. A method as recited in claim 12 wherein levitating comprises levitating the payload fairing relative to the launch vehicle body by magnetic repulsive force.

14. A method as recited in claim 13 further comprising positioning a first magnet on the payload fairing and a second magnet on the payload fairing.

15. A method as recited in claim 14 wherein positioning comprises positioning the first magnet in a first slot and a second magnet in a second slot.

16. A launch vehicle assembly comprising:
    a launch vehicle body having a first slot disposed in a payload attachment fitting;
    a first magnet disposed within said first slot, said first slot disposed within said payload attachment fitting;
    a fairing assembly positioned adjacent to the vehicle body, said fairing assembly having a second slot therein, second slot positioned opposite said first slot;
    a second magnet disposed within said second slot so that said second magnet repels said first magnet.

* * * * *

UNITED STATES PATENT AND TRADEMARK OFFICE
CERTIFICATE OF CORRECTION

PATENT NO. : 6,695,261 B2
APPLICATION NO. : 10/073617
DATED : February 24, 2004
INVENTOR(S) : Mark Cleveland It is certified that error appears in the above-identified patent and that said Letters Patent is hereby corrected as shown below:

Column 6, lines 53-62 should read as follows:
--16. A launch vehicle assembly comprising:
a launch vehicle body having a first slot disposed in a payload attachment fitting;
a first magnet disposed within said first slot, said first slot disposed within said payload attachment fitting;
a fairing assembly positioned adjacent to the vehicle body, said fairing assembly having a second slot therein, said second slot positioned opposite said first slot;
a second magnet disposed within said second slot so that said second magnet repels said first magnet, and said fairing assembly contacting the launch vehicle body when a predetermined force acts on the payload fairing and levitating relative to the launch vehicle body when a force below the predetermined force acts on the fairing assembly.--

Signed and Sealed this

Fourth Day of September, 2007

JON W. DUDAS
*Director of the United States Patent and Trademark Office*